No. 876,467. PATENTED JAN. 14, 1908.
S. P. MARSH & N. TIMSON.
SLOUGH FILLER.
APPLICATION FILED SEPT. 20, 1907.

2 SHEETS—SHEET 1.

Witnesses.

Inventors.

No. 876,467. PATENTED JAN. 14, 1908.
S. P. MARSH & N. TIMSON.
SLOUGH FILLER.
APPLICATION FILED SEPT. 20, 1907.

2 SHEETS—SHEET 2.

Witnesses. Inventors.

UNITED STATES PATENT OFFICE.

SELDON PORTER MARSH, OF WOLSELEY, SASKATCHEWAN, AND NEWTON TIMSON, OF WINNIPEG, MANITOBA, CANADA.

SLOUGH-FILLER.

No. 876,467.	Specification of Letters Patent.	Patented Jan. 14, 1908.

Application filed September 20, 1907. Serial No. 393,830.

*To all whom it may concern:*

Be it known that we, SELDON PORTER MARSH, blacksmith, of the town of Wolseley, in the Province of Saskatchewan, Canada, and NEWTON TIMSON, of the city of Winnipeg, in the Province of Manitoba, Canada, have invented certain new and useful Improvements in Slough-Fillers, of which the following is the specification.

Our invention relates to slough fillers, more especially wheeled fillers, and the objects of the invention are to provide, firstly, a filler which makes it unnecessary for the draft animals to enter the slough, secondly, a filler which has simple means governing the depth to which the filler blade scrapes, thirdly, a filler in which the draft animals supply the necessary power for raising the blade, and lastly a filler which may be readily knocked down for transportation.

With these objects in view the invention consists in certain novel features of construction and arrangement of parts hereinafter more fully described, illustrated in the accompanying drawings, and particularly pointed out in the appended claims, it being understood that various changes in the form, proportion, size, and minor details of construction may be made without departing from the spirit, or sacrificing any of the advantages of the invention.

Figure 1:
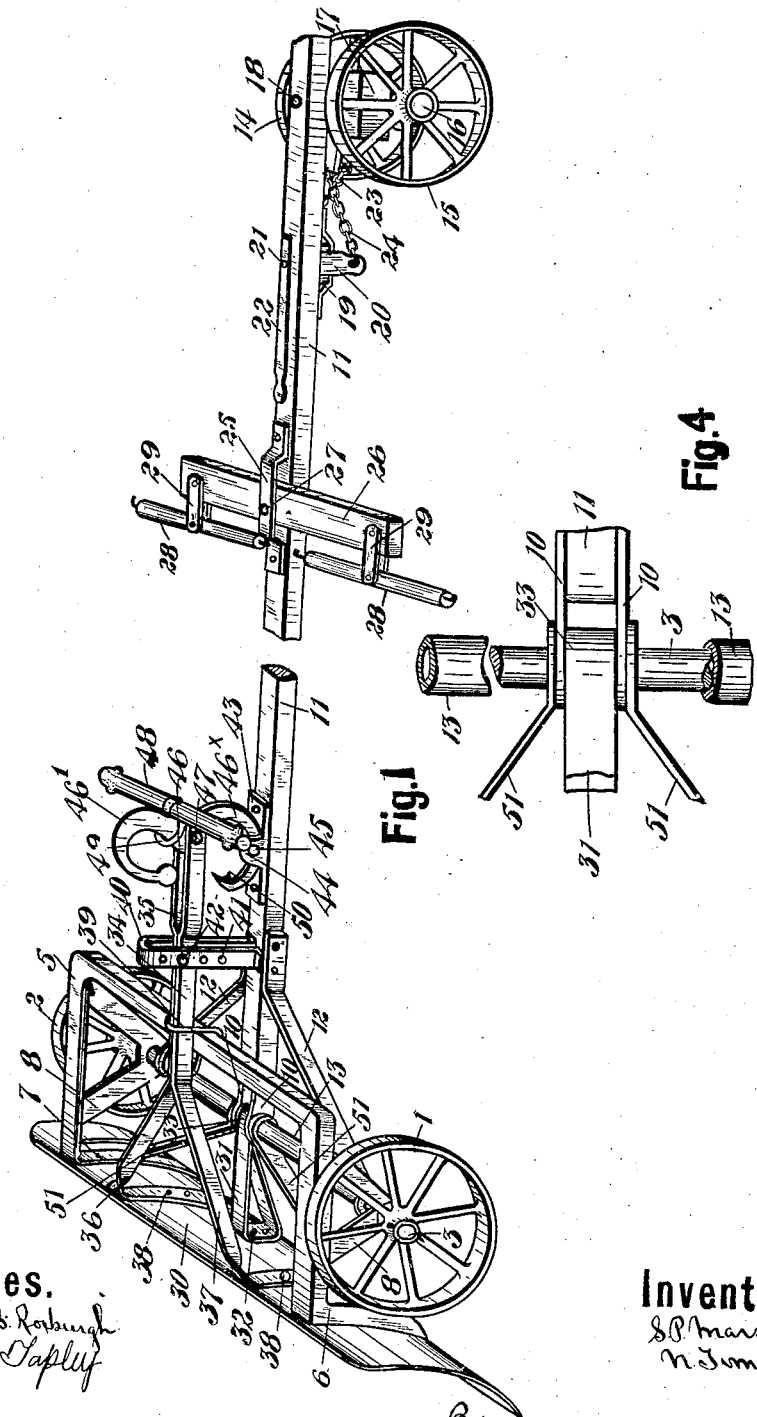
Figure 2:
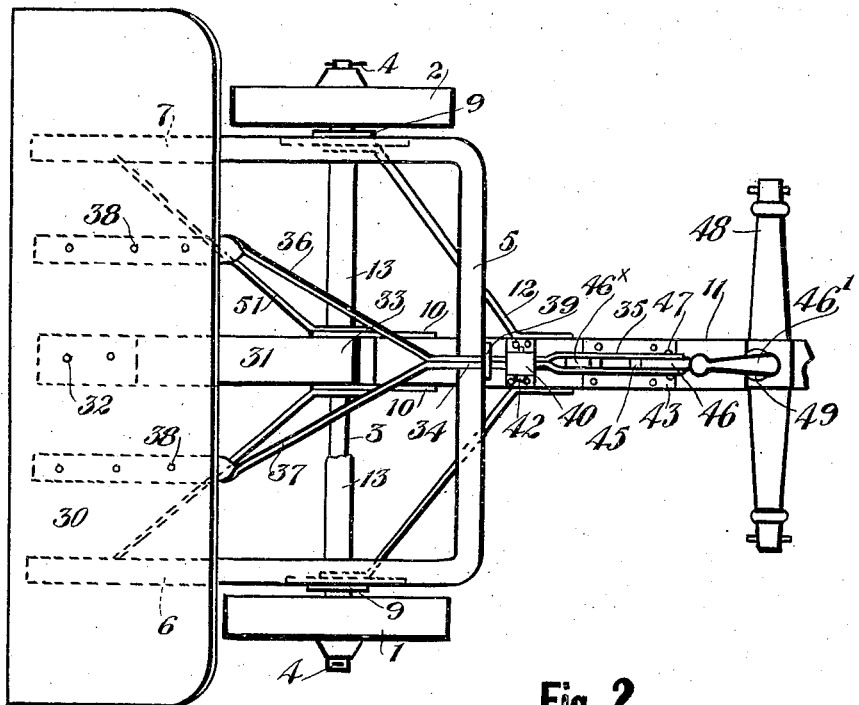
Figure 3:
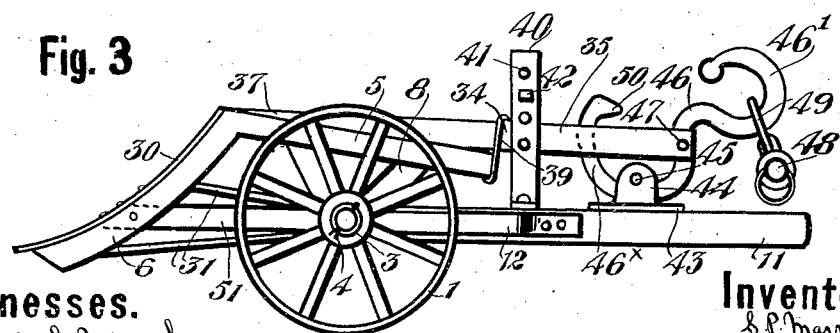

In the drawings, Figure 1 is a perspective view of our slough filler, the tongue or draft bar being broken in order to shorten the length of the machine, to comply with the sheet, the blade being in the lower position. Fig. 2 is an enlarged plan view of the forward portion of the machine, the part with the steering gear, and whiffle trees being removed, and the blade being shown in the upper position. Fig. 3 is a side elevation as in Fig. 2. Fig. 4 is an enlarged detailed plan view showing the manner in which the blade or scoop is fastened centrally to the axle.

In the drawings like characters of reference indicate corresponding parts in each figure.

1 and 2 are the forward carriage wheels inter-connected by a shaft 3 on which the wheels revolve, the wheels being held on the shaft by end pins 4.

5 is the main supporting frame for the blade, the frame being in plan view of a U-shaped form, as clearly shown in Fig. 2. The ends 6 and 7 of the side arms are bent downwardly and curved, the curve being formed to fit the curve in the blade, as hereinafter more fully described. The supporting frame-work 5 is angle bar shaped in cross section.

8 are V-shaped brackets, one at either side of the frame 5, to which they are bolted at their upper ends, and the shaft 3 passes through the angle of the bracket, in this wise pivotally supporting the frame and its dependencies, from the shaft. These side brackets have on their outer face at the angle, a face plate 9, against the inner face of which the hub of the wheels bear.

Centrally of the shaft are two similar arms 10, spaced slightly apart and extending rearwardly. The shaft passes through the arms at their forward end and the extending portions are fastened to the forward end of the draft bar or tongue 11.

12 are braces passing between the draft bar and the shaft, being fastened to the shaft, by the shaft passing through their ends, such ends being located immediately to the inside of the brackets 8. Between the latter braces and the arms 10 are sleeves 13 on the shaft. Such sleeves serve to space properly the arms and the braces, and also to give rigidity to the structure, it being remembered that the complete machine has to be constructed so that it will readily knock down.

14 and 15 are steering wheels fastened rigidly to an axle 16, which is rotatable in bearings formed on the lower face of the cross block 17.

18 is a bolt or pin pivotally connecting the end of the draft bar with the block, there being the ordinary center plates between the block and the draft bar.

19 is a bracket on the lower face of the draft bar, and 20 is a cross arm secured on a pin 21, passing downwardly through the draft bar, and finding bearing at its lower end in the bracket.

22 is a lever fastened to the upper end of the pin 21.

23, 24 are chains inter-connecting the ends of the arm 20, with the block 17, the chains crossing one another, so that the machine turns to the same side as that to which the lever is thrown.

25 is a bracket fastened on the upper face of the draft bar, slightly forward of the lever, and 26 is a double-tree, held by the pin 27, which passes through the bracket, into the draft bar.

28 are the ordinary whiffle trees, connected by links 29 to the double tree. These latterly described rear portions of the machine may be of any preferred form, and I do not wish to restrict myself to the precise form of steering gear as shown in the drawing.

30 is the blade or scoop, which is rectangular in form and curved in cross section, and may be formed from sheet steel or any other such like strong material. The blade is bolted or riveted to the ends 6 and 7 of the side arms, which as before explained are curved to fit the blade.

31 is a central support or reinforcing arm to the blade, such arm being more or less of a triangular form, and fastened forwardly by bolts 32 to the under face of the blade, and rearwardly to the axle, there being a loop 33 formed, through which the axle passes. It will be noticed that the loop is directly between the arms 10.

34 is the blade operating bar, being forked rearwardly at 35, and having forwardly two arms 36, 37, which are bent downwardly, curved and bolted by bolts 38 to the blade.

39 is a clip or tie, fastening the operating arm to the framework 5, centrally.

40 is an inverted, elongated U-shaped upright, fastened to the draft bar immediately to the rear of the frame 5, and has opposing sets of openings 41 to receive a pin 42, which may be placed in any position, either toward the top or bottom of the upright.

43 is a plate fastened on the draft bar to the rear of the upright, such plate having a set of upright lugs 44, through which a pin or bolt 45 passes.

46 is a doubly hooked arm, being connected to the forked end 35 of the arm 34 by a pin 47. The lower hooked end 46× passes under the pin 45, and is bent so that the pin travels on the arm when the arm 34 is thrown upwardly or downwardly.

48 is a neck yoke of the ordinary form, such yoke being connected by a ring 49 to the upper hooked end 46′ of the hooked arm.

50 is a lug in the form of a barb, to prevent the pin 45 from passing over the end of the lower hook 46×.

51 are reinforcing braces passing between the blade and the axle, being secured at their forward ends to the ends 6 and 7, respectively, of the side arms, and rearwardly to the axle, which axle passes through the braces.

When our machine is in use the draft animals are hitched in the ordinary manner to the single trees and the yoke, there being an animal on each side of the draft bar. In this way the animals face the blades and in using the machine are always clear of the slough.

It will be seen that according to the position of the pin 42, which is always above the arm 34, so the depth to which the tip of the blade scrapes, as it will be forced down until the arm engages the pin when the team is going forward. When the team is backing they pull directly on the upper hooked end 46′, and on account of the peculiar connection between the hooked arm and the blade, the blade is raised. This raise of the blade by the draft animals is an important part of our invention.

To more thoroughly understand points in the construction as hereinbefore described we will now show how the machine is taken apart for transportation.

By undoing the pins in the axle or shaft 3, it may be pulled out and removed. When this is done all the parts are freed, and the blade can be lifted with the framework 5. The bolts holding the upright 40 can be removed, as well as the pin or bolt 45, and this allows practically all the forward portion of the machine to be removed and crated if desired.

When using the machine in filling sloughs, the dirt or other like material is simply scooped into the slough by the blade, which, being comparatively large, saves a great deal of time and labor.

What we claim as our invention is:

1. In a wheeled slough filler, the combination with the supporting axle of a pivotally supported forward scoop, and a rearwardly extending draft bar, as and for the purpose specified.

2. In a wheeled slough filler, the combination with the supporting axle, of a framework pivotally supported from the axle by brackets extending downwardly from the framework, and a curved scoop forward of the wheels and carried by the framework, a draft bar extending rearwardly from the axle, means for determining the lower position of the scoop, and a steering gear at the rear end of the draft bar, as and for the purpose specified.

3. In a wheeled slough filler, the combination with the supporting axle, of a curved scoop forward of the wheels and pivotally supported from the axle, a rearwardly extending draft bar, a steering gear at the end of the draft bar, means on the draft bar for the attachment of a draft team, adjustable means for determining the lower position of the scoop, and means whereby the backing of the draft animals raises the scoop, as and for the purpose specified.

4. In a wheeled slough filler, the combination with the supporting axle, of a pivotally supported curved scoop forward of the carriage wheels, a rearwardly extending draft bar, a set of steering wheels supporting the rear end of the draft bar, a scoop operating bar extending rearwardly from the scoop, an inverted U-shaped upright on the draft bar through which the said scoop operating bar passes, an adjusting pin carried by the upright, and a doubly hooked arm connected centrally to the scoop operating bar, and having its lower hooked end slidably connected with the draft bar, as and for the purpose specified.

5. A wheeled slough filler, comprising in combination a set of forward carriage wheels, a removable axle, a rearwardly extending draft bar, a scoop forward of the wheels and pivotally connected to the axle, braces interconnecting the scoop with the axle, and braces between the draft bar and the axle, sleeves on the axle, all of said braces and connecting means for the scoop and the draft bar to the axle, being so designed that the removal of the axle releases the scoop, as and for the purpose specified.

6. A wheeled slough filler, comprising in combination a forward pivotally supported scoop, and a rearward draft bar, said scoop and draft bar being interconnected in a manner that the removal of the supporting axle allows the parts to be disattached, as and for the purpose specified.

7. In a wheeled slough filler, the combination with the supporting axle, the scoop pivotally connected to and forward of the axle, the rearwardly extending draft bar, of a rearwardly extending adjusting bar to the scoop, and means interconnecting the adjusting bar with the draft bar, the backward motion of such means being adapted to raise the scoop, as and for the purpose specified.

8. In a wheeled slough filler, the combination with the supporting axle, of a forward scoop pivotally connected to the axle, as and for the purpose specified.

Signed at Winnipeg, in the Province of Manitoba, this 4th day of September, 1907.

SELDON PORTER MARSH.
NEWTON TIMSON.

Witnesses:
M. A. SOMERVILLE,
GERALD S. ROXBURGH.